United States Patent
Jia et al.

(10) Patent No.: US 11,637,892 B2
(45) Date of Patent: *Apr. 25, 2023

(54) METHOD FOR DISTRIBUTING VIRTUAL VISUAL CONTENT

(71) Applicant: EMC IP Holding Company LLC, Hopkinton, MA (US)

(72) Inventors: Zhen Jia, Shanghai (CN); Danqing Sha, Shanghai (CN); Bin He, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 14 days.

This patent is subject to a terminal disclaimer.

(21) Appl. No.: 17/159,412

(22) Filed: Jan. 27, 2021

(65) Prior Publication Data

US 2022/0210217 A1 Jun. 30, 2022

(30) Foreign Application Priority Data

Dec. 31, 2020 (CN) .......................... 202011624241.5

(51) Int. Cl.
*H04L 67/10* (2022.01)
*H04L 67/52* (2022.01)
(Continued)

(52) U.S. Cl.
CPC .............. *H04L 67/10* (2013.01); *H04L 67/52* (2022.05); *H04L 67/54* (2022.05); *G06F 3/011* (2013.01)

(58) Field of Classification Search
CPC .................................. H04L 67/10; G06F 3/011
See application file for complete search history.

(56) References Cited

U.S. PATENT DOCUMENTS 7,219,364 B2  5/2007 Bolle et al.
11,032,590 B2  6/2021 Shi et al.
(Continued)

FOREIGN PATENT DOCUMENTS

KR       20190106306 A    9/2019
WO   PCT/US2021/029534    10/2021

OTHER PUBLICATIONS

M. Chen et al., "Spatiotemporal GMM for Background Subtraction with Superpixel Hierarchy," IEEE Transactions on Pattern Analysis and Machine Intelligence, vol. 40, No. 6, Jun. 2018, 8 pages.

(Continued)

*Primary Examiner* — Hua Fan
(74) *Attorney, Agent, or Firm* — Ryan, Mason & Lewis, LLP (57) ABSTRACT

Embodiments of the present disclosure provide a method for distributing virtual visual content, including: sending a first content portion in virtual visual content to be interacted in user equipment to a plurality of edge devices; selecting at least one edge device from the plurality of edge devices; and sending a second content portion in the virtual visual content to the selected at least one edge device, the second content portion having a higher change rate than the first content portion in the interaction. According to the embodiments of the present disclosure, a portion of virtual visual content can be distributed to selected edge devices in advance, and there is no need to distribute the virtual visual content to all edge devices, thereby saving network burden, reducing bandwidth requirements, and improving distribution efficiency.

20 Claims, 7 Drawing Sheets

(51) Int. Cl.
*H04L 67/54* (2022.01)
*G06F 3/01* (2006.01)

(56) References Cited

U.S. PATENT DOCUMENTS

| | | | | |
|---|---|---|---|---|
| 2002/0091792 | A1* | 7/2002 | Janniello | H04L 29/06 709/217 |
| 2003/0140088 | A1* | 7/2003 | Robinson | H04L 67/325 709/202 |
| 2009/0138544 | A1 | 5/2009 | Wegenkittl et al. | |
| 2010/0323715 | A1 | 12/2010 | Winters | |
| 2011/0276653 | A1 | 11/2011 | Matsui et al. | |
| 2014/0304750 | A1* | 10/2014 | Lemmey | H04N 21/478 725/75 |
| 2018/0270531 | A1 | 9/2018 | Ye et al. | |
| 2020/0077124 | A1 | 3/2020 | Shi et al. | |
| 2020/0213440 | A1* | 7/2020 | Ng | H04M 1/72457 |
| 2020/0366899 | A1 | 11/2020 | Fitzgerald et al. | |

OTHER PUBLICATIONS

J. Huang et al., "An Efficient Optical Flow Based Motion Detection Method for Non-stationary Scenes," arXiv:1811.08290v2 [cs.CV], Nov. 21, 2018, 6 pages.

J. Redmon et al., "You Only Look Once: Unified, Real-Time Object Detection," arXiv:1506.02640v5 [cs.CV], May 9, 2016, 10 pages.

Linux Foundation, "Akraino—LF Edge," https://www.lfedge.org/projects/akraino/, Accessed Sep. 28, 2020, 4 pages.

U.S. Appl. No. 17/079,632 filed in the name of Zhen Jia et al. filed Oct. 26, 2020, and entitled "Method, Device, and Computer Program Product for Managing Virtual Visual Content."

* cited by examiner

METHOD FOR DISTRIBUTING VIRTUAL VISUAL CONTENT

RELATED APPLICATION(S)

The present application claims priority to Chinese Patent Application No. 202011624241.5, filed Dec. 31, 2020, and entitled "Method for Distributing Virtual Visual Content," which is incorporated by reference herein in its entirety.

FIELD

Embodiments of the present disclosure relate to the technical field of virtual reality and augmented reality (VR/AR) and, more particularly, to a method, an electronic device, a computer-readable storage medium, and a computer program product for distributing virtual visual content.

BACKGROUND

The presentation of virtual visual content can bring a rich and vivid experience to people. For example, VR can provide an immersive virtual environment experience for people, while AR can integrate virtual information with the real world so that people obtain an enhanced experience of the real world. With the development of technologies, virtual visual content presentation technologies have been applied in various different industries.

Virtual visual content presentation technologies are computationally intensive, which requires powerful processing capabilities and sufficient storage space. Some conventional solutions distribute virtual visual content to computationally powerful devices far away from user equipment for viewing virtual visual content for processing. However, such solutions tend to result in increased delays in user interaction with the virtual visual content. In contrast, in order to reduce delays, other conventional solutions distribute the processing in virtual visual content presentation technologies to user equipment for viewing virtual visual content as much as possible. However, such solutions require high-performance user equipment, which not only makes a content viewing device of a user expensive and oversized, but also causes the user equipment to overheat and have a shortened service life due to an excessive load.

Therefore, distributing virtual visual content is an important challenge in the technical field of VR and AR.

SUMMARY

The present disclosure provides a solution for intelligently distributing virtual visual content, which can efficiently and accurately distribute different portions of virtual visual content to various types of computing devices, thereby improving user experience and performance.

According to a first aspect of the present disclosure, a method for distributing virtual visual content is provided. The method includes: sending a first content portion in virtual visual content to be interacted in user equipment to a plurality of edge devices; selecting at least one edge device from the plurality of edge devices; and sending a second content portion in the virtual visual content to the selected at least one edge device, the second content portion having a higher change rate than the first content portion in the interaction.

According to a second aspect of the present disclosure, an electronic device is provided. The electronic device includes: at least one processing unit; and at least one memory coupled to the at least one processing unit and storing instructions configured to be executed by the at least one processing unit. The instructions, when executed by the at least one processing unit, cause the electronic device to perform actions including: sending a first content portion in virtual visual content to be interacted in user equipment to a plurality of edge devices; selecting at least one edge device from the plurality of edge devices; and sending a second content portion in the virtual visual content to the selected at least one edge device, the second content portion having a higher change rate than the first content portion in the interaction.

According to a third aspect of the present disclosure, a non-transient computer storage medium is provided. The non-transient computer storage medium includes machine-executable instructions that, when executed by a device, cause the device to perform the method as described in the first aspect.

According to a fourth aspect of the present disclosure, a computer program product is provided. The computer program product includes machine-executable instructions that, when executed by a device, cause the device to perform the method as described in the first aspect.

In this way, a portion of virtual visual content can be distributed to selected edge devices in advance, and there is no need to distribute the virtual visual content to all edge devices, thereby saving network burden, reducing bandwidth requirements, and improving distribution efficiency.

It should be understood that this Summary is neither intended to identify key or essential features of the embodiments of the present disclosure, nor intended to limit the scope of the present disclosure. Other features of the present disclosure will become readily understandable through the following description.

BRIEF DESCRIPTION OF THE DRAWINGS

The above and other objectives, features, and advantages of the embodiments of the present disclosure will become more readily understandable through the following detailed description with reference to the accompanying drawings. In the accompanying drawings, a plurality of embodiments of the present disclosure will be illustrated by way of example and not limitation, where.

The same or corresponding reference numerals in the various drawings represent the same or corresponding portions.

DETAILED DESCRIPTION

The principles and ideas of the present disclosure will now be illustrated with reference to various example embodiments shown in the accompanying drawings. It should be understood that these embodiments are described solely to enable those skilled in the art to better understand and further implement the present disclosure, and are not intended to limit the scope of the present disclosure in any way. It should be noted that similar or identical reference numerals may be used in the drawings where feasible, and that similar or identical reference numerals may indicate similar or identical elements. It will be understood by those skilled in the art that, from the description that follows, alternative embodiments of the structures and/or methods illustrated herein may be employed without departing from the principles and ideas of the present disclosure as described.

In the context of the present disclosure, the term "including" and its various variants may be understood as open-ended terms meaning "including but not limited to;" the term "based on" may be understood as "at least partially based on;" the term "an embodiment" may be understood as "at least one embodiment;" and the term "another embodiment" may be understood as "at least one other embodiment." Other terms that may appear but are not mentioned here, unless explicitly stated, should not be interpreted or limited in a manner that is contrary to the principles and ideas on which the embodiments of the present disclosure are based.

The presentation of virtual visual content can bring a rich and vivid experience to people. For example, VR can provide an immersive virtual environment experience for people, while AR can integrate virtual information with the real world so that people obtain an enhanced experience of the real world. With the development of technologies, virtual visual content presentation technologies are applied in various different industries.

Virtual visual content presentation technologies are computationally intensive, which requires powerful processing capabilities and sufficient storage space. Some conventional solutions cause the processing in virtual visual content presentation technologies to be performed at computationally powerful cloud devices far away from content viewing devices of users. However, such solutions tend to result in increased delays in user interaction with the virtual visual content. Since human beings are very sensitive to the delay of virtual visual content, a too large delay will cause disorientation and nausea for users viewing virtual visual content. Therefore, virtual visual content presentation technologies must meet high delay requirements. Generally speaking, an acceptable delay is within 5 milliseconds. Once the delay requirement is not met, users will feel uncomfortable, which greatly reduces user satisfaction.

In order to reduce the delay, other conventional solutions integrate the processing in virtual visual content presentation technologies on content viewing devices for viewing the virtual visual content as much as possible. The content viewing devices are, for example, AR/VR headsets, AR glasses, etc. However, because the virtual visual content presentation technology is computationally intensive, integrating the virtual visual content presentation technology on a content viewing device not only makes the content viewing device expensive and oversized, but also causes the content viewing device to overheat and have a shortened service life due to an excessive load.

In the 5G era, mobile edge computing (MEC) is a key characteristic. A plurality of mobile edge devices may work together to achieve information distribution and support localized computing. Edge devices in a 5G network bring huge benefits to network performance and user experience. Edge devices serve their own geographic areas and are closer to mobile devices than cloud devices are, so communication delays are shorter, but they have higher performance than the mobile devices. Therefore, virtual visual content required to support AR/VR may be distributed to user equipment, edge devices, and a cloud for processing and storage, so that lightweight and low-cost user equipment may be produced while reducing the delays from the cloud to the user equipment.

U.S. patent application Ser. No. 17/079,632, filed on Oct. 26, 2020 and entitled "Method, Device, and Computer Program for Managing Virtual Visual Content," which is incorporated by reference herein in its entirety, describes a solution for managing virtual visual content.

Embodiments of the present disclosure provide a method for distributing virtual visual content, including: sending a first content portion in virtual visual content to be interacted in user equipment to a plurality of edge devices; selecting at least one edge device from the plurality of edge devices; and sending a second content portion in the virtual visual content to the selected at least one edge device, the second content portion having a higher change rate than the first content portion in the interaction. Through this solution, a portion of virtual visual content can be distributed to selected edge devices in advance, and there is no need to distribute the virtual visual content to all edge devices, thereby saving network burden, reducing bandwidth requirements, and improving distribution efficiency.

Basic principles and implementations of the present disclosure are illustrated below with reference to the drawings. It should be understood that example embodiments are provided only to enable those skilled in the art to better understand and then implement the embodiments of the present disclosure, and not to limit the scope of the present disclosure in any way.

Figure 1:
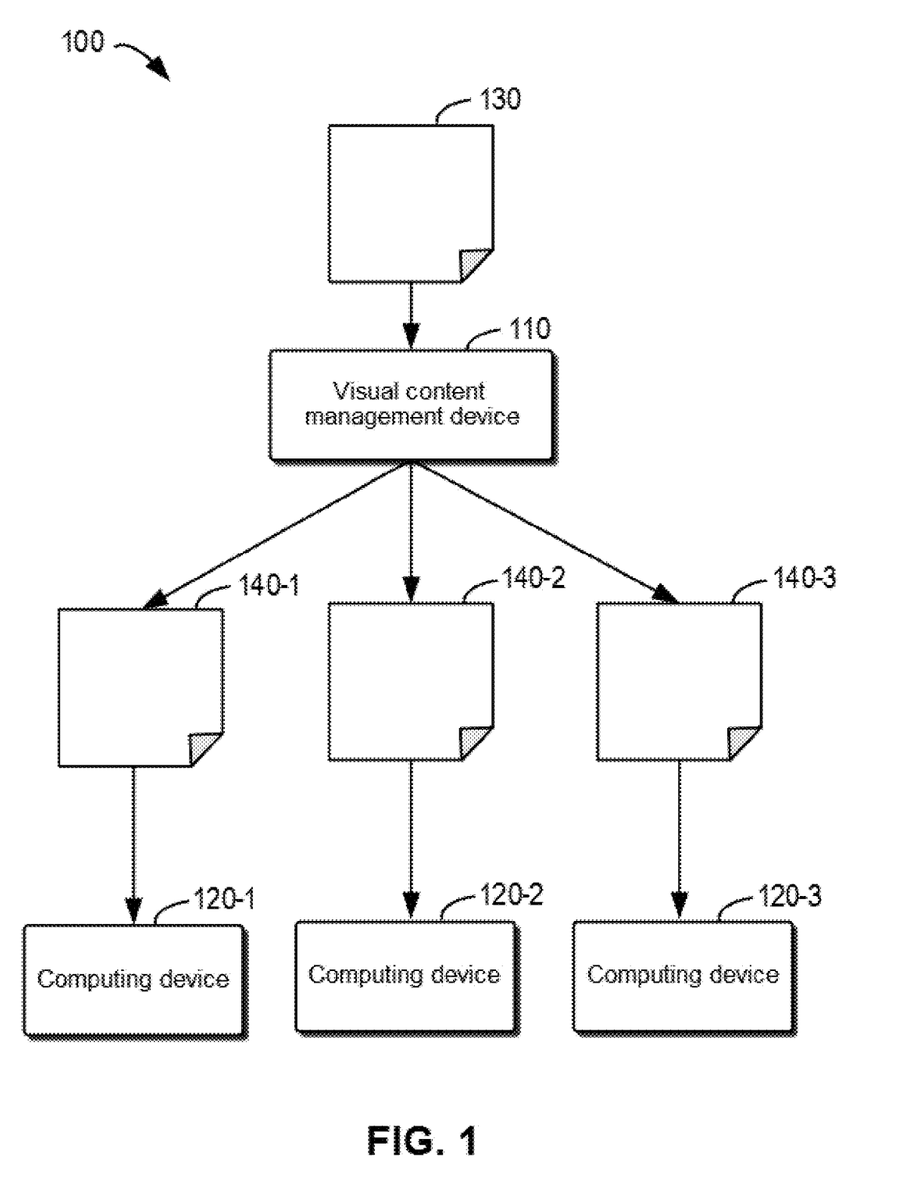
FIG. 1 shows a block diagram of an example visual content management system according to an embodiment of the present disclosure.

FIG. 1 shows a block diagram of example visual content management system 100 according to an embodiment of the present disclosure. As shown in FIG. 1, visual content management system 100 includes visual content management device 110 and computing devices 120-1 to 120-3 (collectively referred to as computing device 120).

As shown in FIG. 1, visual content management device 110 may determine a plurality of content portions 140-1 to 140-3 (collectively referred to as content portion 140) from virtual visual content 130 that is to be interacted with a user. The plurality of content portions 140-1 to 140-3 have different change frequencies in this interaction. Visual content management device 110 may transmit, respectively, the plurality of content portions 140-1 to 140-3 to the plurality of computing devices 120-1 to 120-3 having different proximities to the user.

Visual content management device 110 may be, for example, a computer, a virtual machine, a server, a cloud computing device, etc. The plurality of computing devices 120 may be devices that have different proximities to the user. "Proximity" herein may refer to the degree of proximity in spatial distance, or the speed of transmitting virtual visual content. Having different proximities to the user means that the delays required for the user to interact with the virtual visual content are different. Additionally, the plurality of computing devices 120 may be devices having different processing capabilities. For example, in some embodiments, computing device 120 may be an AR/VR content viewing device. The AR/VR content viewing device may be a smart phone, a smart tablet, a smart wearable device, an independent AR/VR headset, independent AR glasses, etc. Alternatively or additionally, in some embodiments, computing device 120 may be an edge device, which may also be referred to as an edge server, an edge node, a mobile edge computing device, etc. Alternatively or additionally, in some embodiments, computing device 120 may be a cloud computing device. Visual content management device 110 and computing device 120 may be connected to each other through a network. The network may be the Internet, intranet, etc. The present disclosure is not limited in this regard.

It should be understood that the structure of visual content management system 100 is described for exemplary purposes only, and does not imply any limitation to the scope of the present disclosure. For example, the embodiments of the present disclosure may also be applied to a system different from visual content management system 100. It should be understood that the above devices, virtual visual content, and the specific number of content portions are given for illustrative purposes only, and do not imply any limitation to the scope of the present disclosure.

Virtual visual content 130 includes content portions 140 that have different change frequencies in interaction. In some embodiments, virtual visual content 130 may include content portions that hardly change in interaction with the user. These content portions are constant or may change at a very low frequency, and may be referred to as a background layer in the present disclosure. For example, in a scenario where virtual visual content 130 is an indoor home design, the background layer may include background objects such as indoor floors and walls, outdoor scenery, and the like. In some embodiments, virtual visual content 130 may include content portions that change moderately in interaction with the user, which may be referred to as a foreground layer in the present disclosure. For example, the foreground layer may include foreground objects such as moving people and changing light. Additionally or alternatively, in some embodiments, virtual visual content 130 may include content portions that change frequently in interaction with the user, which may be referred to as an interaction layer in the present disclosure. For example, the interaction layer may include interaction objects of interaction components such as buttons, doors, selection panels, or switches, and the user may interact with these interaction components to change the presented virtual visual content.

Visual content management device 110 may determine a plurality of content portions 140 having different change frequencies from virtual visual content 130 through various methods such as computer vision and machine learning. In some embodiments, visual content management device 110 may determine a static content portion (e.g., background layer) and a dynamic content portion from virtual visual content 130. The change frequency of the dynamic content portion is higher than that of the static content portion. Additionally, in some embodiments, visual content management device 110 may also determine a first dynamic content portion (e.g., foreground layer) and a second dynamic content portion (e.g., interaction layer) from the dynamic content portion. The change frequency of the second dynamic content portion is higher than that of the first dynamic content portion. The details of determining the plurality of content portions 140 from virtual visual content 130 will be described in detail below with reference to FIGS. 2A, 2B, and 3.

In some embodiments, visual content management device 110 may apply background subtraction to virtual visual content 130 so as to determine a first content portion and a second content portion from virtual visual content 130. The change frequency of the second content portion is higher than that of the first content portion. The background subtraction is a classic computer vision method for separating background objects from foreground objects. The background subtraction is, for example, background subtraction based on a Gaussian mixture model. Any background subtraction method that is currently known or to be developed in the future may be used in the embodiments of the present disclosure, and the scope of the present disclosure is not limited thereto. In the embodiments of the present disclosure, a background object may correspond to the first content portion, and a foreground object may correspond to the second content portion. After determining the first content portion and the second content portion from virtual visual content 130, visual content management device 110 may determine the first content portion and the second content portion as a static content portion and a dynamic content portion, respectively.

Alternatively or additionally, in some embodiments, visual content management device 110 may apply a motion detection method to virtual visual content 130 so as to determine a first content portion and a second content portion from virtual visual content 130. The change frequency of the second content portion is higher than that of the first content portion. For example, visual content management device 110 may use an optical flow-based motion detection method to detect moving objects in virtual visual content 130. Any motion detection method that is currently known or to be developed in the future may be used in the embodiments of the present disclosure, and the scope of the present disclosure is not limited thereto.

Figure 2A:
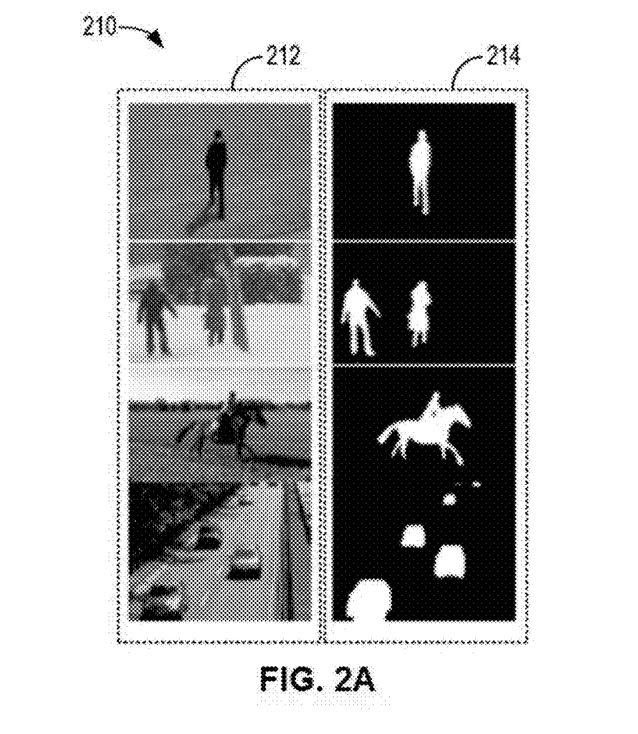
FIG. 2A shows a schematic diagram of a result of applying a background subtraction or motion detection method to virtual visual content according to an embodiment of the present disclosure.

The result of the background subtraction or motion detection method is described below with reference to FIG. 2A. FIG. 2A shows schematic diagram 210 of a result of applying a background subtraction or motion detection method to virtual visual content 212 according to an embodiment of the present disclosure. As shown in FIG. 2A, applying a background subtraction or motion detection method to virtual visual content 212 will result in processed virtual visual content 214. In processed virtual visual content 214, a black area indicates a background object area, and a white area indicates a foreground object area. In this case, visual content management device 110 may determine a content portion corresponding to the black area as a static content portion, and a content portion corresponding to the white area as a dynamic content portion.

Alternatively or additionally, in some embodiments, visual content management device 110 may apply machine learning-based object detection to virtual visual content so as to determine a first content portion and a second content portion from the virtual visual content. The change frequency of the second content portion is higher than that of the first content portion. For example, visual content management device 110 may apply a trained machine learning model or deep learning model to an input image including a foreground object and a background object to detect the foreground object from the input image. Any machine learning-based object detection method that is currently known or to be developed in the future may be used in the embodiments of the present disclosure, and the scope of the present disclosure is not limited thereto.

Figure 2B:
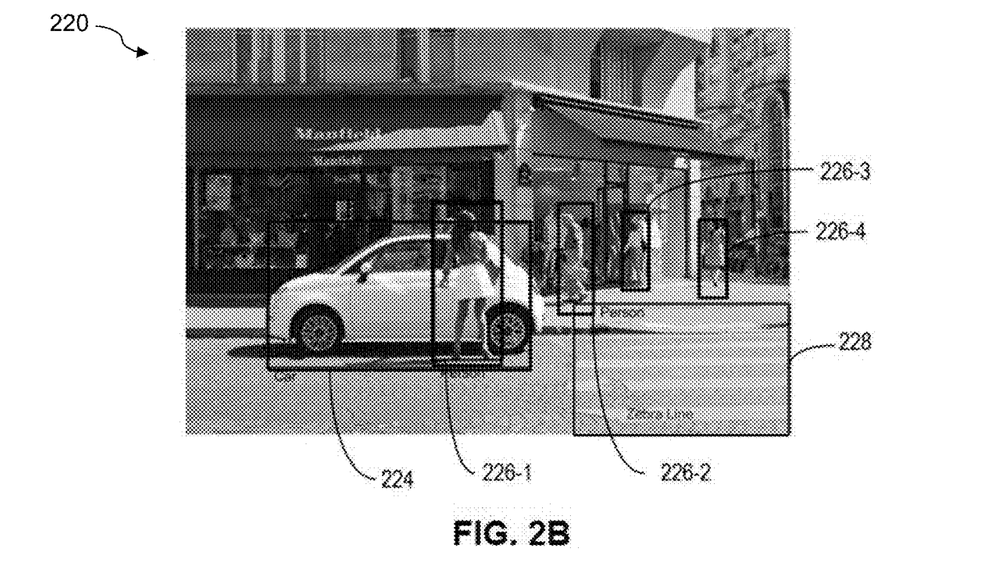
FIG. 2B shows a schematic diagram of a result of applying a machine learning-based object detection method to virtual visual content according to an embodiment of the present disclosure.

The result of the object detection method is described below with reference to FIG. 2B. FIG. 2B shows schematic diagram 220 of a result of applying a machine learning-based object detection method to virtual visual content according to an embodiment of the present disclosure. As shown in FIG. 2B, applying a machine learning-based object detection method to the virtual visual content will result in foreground objects 224, 226, and 228 of different categories. Foreground object 224 belongs to a vehicle category, foreground objects 226-1 to 226-4 belong to a person category, and foreground object 228 belongs to a striped crossing category. In this case, visual content management device 110 may determine foreground objects 224, 226, and 228 as dynamic content portions, and determine the remaining content portions in the virtual visual content as static content portions.

In addition, visual content management device 110 may apply the above-described method for determining the static content portion and the dynamic content portion from virtual visual content to the dynamic content portion again, thereby determining the first dynamic content portion and the second dynamic content portion from the dynamic content portion. Further dividing the dynamic content portion enables the dynamic content portion to be further subdivided into content portions having different change frequencies, so that the dynamic content portion is also transmitted to different devices for processing, thereby further reducing the delay of interaction with the user, and further reducing the load of user equipment for viewing virtual visual content.

For example, visual content management device 110 may determine statistics on change frequencies of the dynamic content portion, and then determine a content portion having a low change frequency according to the statistics as the first dynamic content portion and a content portion having a high change frequency according to the statistics as the second dynamic content portion. Alternatively or additionally, visual content management device 110 may also use a sensor of an AR/VR device worn by a user when viewing historical visual content to obtain motion information of the user, and then determine a visual focus area of the user based on the motion information. Visual content management device 110 may determine a content portion corresponding to the visual focus area in the dynamic content portion as the second dynamic content portion. Alternatively or additionally, visual content management device 110 may determine the first dynamic content portion and the second dynamic content portion according to pre-configured labels that are manual labels based on expert experience.

It should be understood that some computer vision and machine learning methods are shown for illustrative purposes only, and do not imply any limitation to the scope of the present disclosure. For example, other computer vision and machine learning methods may also be used to determine a plurality of content portions from the virtual visual content. The present disclosure is not limited in this regard.

In the above example embodiment, by determining a static content portion and a dynamic content portion from virtual visual content, and determining a first dynamic content portion and a second dynamic content portion from the dynamic content portion, the virtual visual content can be divided into content portions having different change frequencies, making it possible to manage different content portions by a plurality of computing devices having different proximities to a user. In other words, through the above description with reference to FIGS. 1, 2A, and 2B, the virtual visual content may be divided into the background layer, the foreground layer, and the interaction layer.

Figure 3:
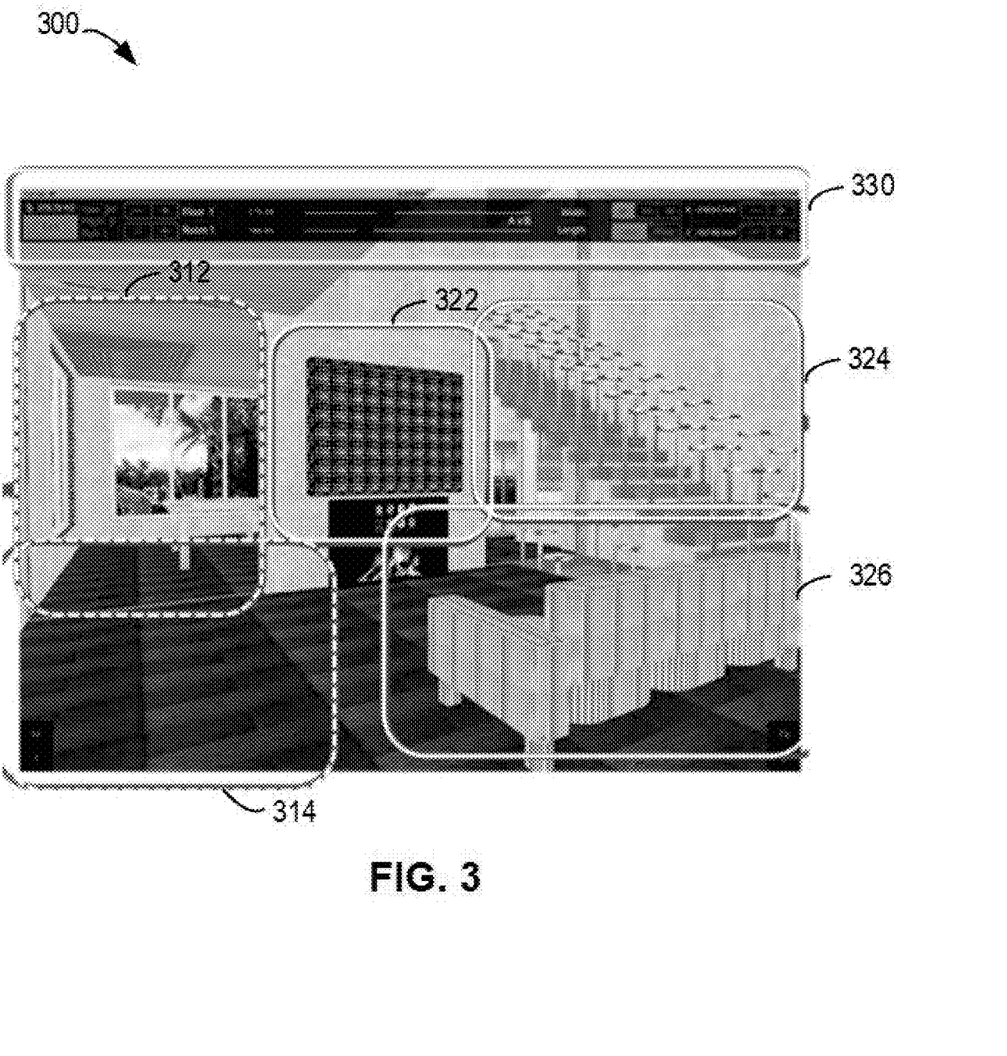
FIG. 3 shows a schematic diagram of example virtual visual content suitable for an embodiment of the present disclosure.

FIG. 3 shows schematic diagram 300 of example virtual visual content suitable for an embodiment of the present disclosure. FIG. 3 shows virtual visual content used for indoor home design. People can use a content viewing device to walk in an empty room, and then put different furniture, decorations, or other items into the room to view virtual effects to evaluate different home designs.

In the embodiments of the present disclosure, visual content management device 110 may determine static content portions, for example, the structure of a room such as walls, doors, or windows from the virtual visual content, as shown in blocks 312 and 314. These content portions do not change, or only change once (for example, the color of wallpaper changes), or the change frequency is very low (for example, lighting conditions or outdoor weather conditions change slowly). These static content portions may be transmitted to a cloud computing device, so that these static content portions are processed and drawn by the cloud computing device.

Visual content management device 110 may also determine dynamic content portions from the virtual visual content, that is, foreground objects, such as chairs, tables, and other furniture, as shown in blocks 322, 324, and 326. These foreground objects may be placed in different positions. These foreground objects may be transmitted to an edge device closer to the user than the cloud computing device is, so that the edge device processes and draws the shapes and appearance of these foreground objects in the environment to reduce delay.

Visual content management device 110 may also determine a user interface selection area that interacts with the user most frequently from the virtual visual content, as shown in block 330. Such user interface may be transmitted to user equipment, so that the user equipment directly processes a received user input to achieve a faster response.

Figure 4:
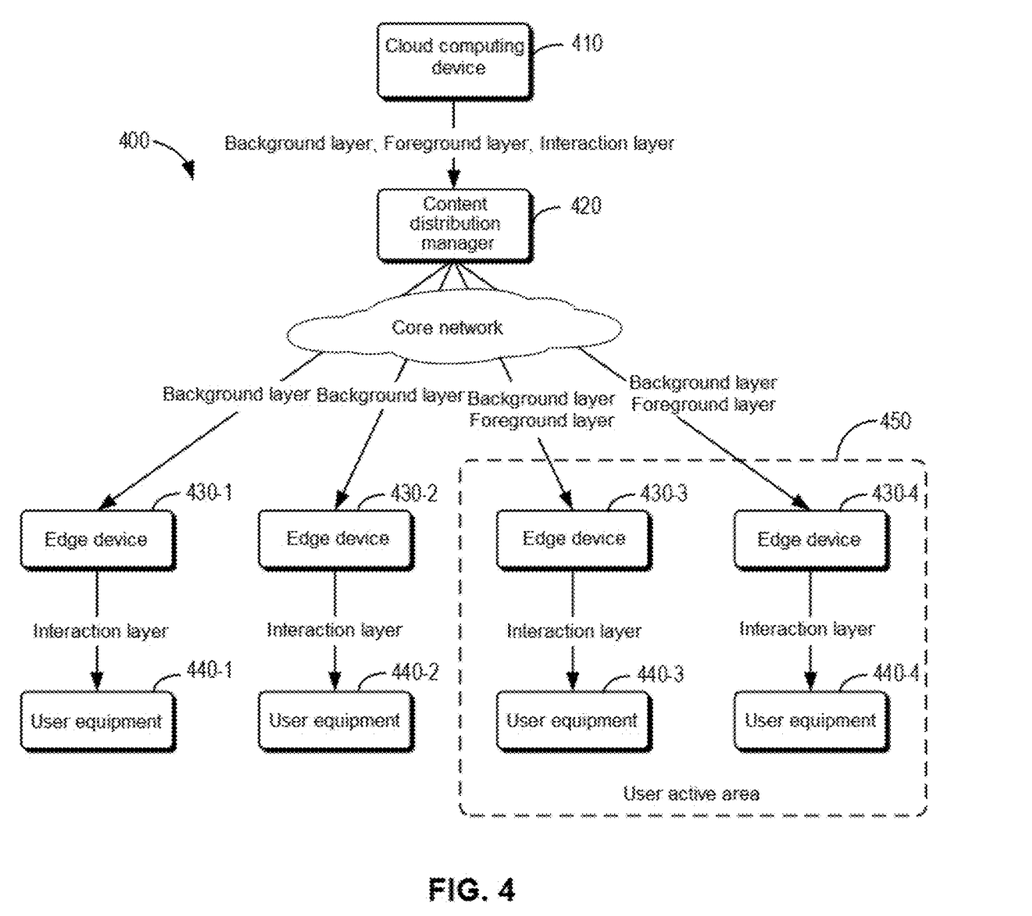
FIG. 4 shows a schematic block diagram of an example visual content distribution system according to an embodiment of the present disclosure.

FIG. 4 shows a schematic block diagram of example visual content distribution system 400 according to an embodiment of the present disclosure. Example visual content distribution system 400 includes cloud computing device 410, edge content distribution manager 420, edge devices 430-1 to 430-4 (collectively referred to as edge device 430), and user equipment 440-1 to 440-4 (collectively referred to as user equipment 440). As mentioned above, cloud computing device 410 may be a centralized or distributed computer cluster with powerful computing power and storage capacity, which is capable of storing a large amount of virtual visual content and quickly completing the processing of the virtual visual content, but is far away, geographically or in communication routing, from user equipment that can present the virtual visual content thereon and interact with the user. In some embodiments, cloud computing device 410 may run an application program (not shown in the figure) associated with VR/AR, for example, on a virtual machine. The application program of cloud computing device 410 may generate, process, and store virtual visual content for distribution to user equipment 440. For example, with reference to the description of FIG. 1, visual content management device 110 may run on cloud computing device 410 to divide the virtual visual content into a background layer, a foreground layer, and an interaction layer according to the change frequency.

Edge content distribution manager 420 may run in the cloud. For example, as shown in FIG. 4, it may be deployed to be separated from cloud computing device 410. Alternatively, edge content distribution manager 420 may also be integrated into cloud computing device 410. Edge content distribution manager 420 is used to control the distribution of virtual visual content from cloud computing device 410 to edge device 430 and then to user equipment 440. As described above with reference to FIGS. 1 to 3, the virtual visual content may be divided into a background layer, a foreground layer, and an interaction layer according to the change frequency. According to the embodiments of the present disclosure, edge content distribution manager 420 not only may manage the distribution of virtual visual content based on the type of the virtual visual content, but also may manage the distribution of virtual visual content according to information related to specific user equipment. This will be described in detail below.

Edge devices 430-1 to 430-4 may also be referred to herein as edge computing devices, edge nodes, edge servers, mobile edge computing devices, etc. Edge device 430 may be deployed, for example, on a radio access network (RAN) side and located at a single base station or at a plurality of base stations, so as to be close to user equipment to provide low delay with user equipment 440, while providing high-performance computing and storage services for user equipment 440. According to the embodiments of the present disclosure, after being generated at cloud computing device 410, the background layer, the foreground layer, and the interaction layer of the virtual visual content may be distributed to edge device 430 associated with specific user equipment 440 in advance. When the user equipment needs to present and interact with virtual visual content, the virtual visual content may be further sent to user equipment 440, thereby reducing the burden on a core network between edge device 430 and cloud computing device 410 during peak periods. It should be noted that although the virtual visual content will be completely presented and interacted on user equipment 440, the background layer, the foreground layer, and the interaction layer of the virtual visual content may be processed at different computing devices. The processing may include rendering. For example, an effect map is generated according to attributes (e.g., spatial position, color, structure, texture, and material) of a model of an object (e.g., walls, doors, windows, tables, chairs, etc. described with reference to FIG. 3) in the virtual visual content and associated lighting conditions.

In some embodiments, edge content distribution manager 420 may distribute the background layer to cloud computing device 410 for processing, and after the processing of cloud computing device 410 is completed, the processed background layer may be distributed to edge devices 430-1 to 430-4 in a certain area. As described above, the background layer may be data that is constant or changes slowly over time, and the background layer has no difference or little difference between different user equipment. Therefore, edge content distribution manager 420 may distribute the processed background layer to all edge devices 430-1 to 430-4 in advance, for example, when user equipment 440 is not online. In other words, the processing and distribution of the background layer may both be completed offline and cached to edge device 430 in advance. In this way, when user equipment 440 is online, it is possible to directly request the processed background layer from corresponding edge device 430 (e.g., edge device deployed with a base station to which the user equipment is connected) instead of requesting, after being online, from cloud computing device 410 with a larger delay, thereby reducing communication congestion and delay and improving user experience.

Edge content distribution manager 420 may also distribute the foreground layer and the interaction layer to edge device 430 and user equipment 440, respectively. Unlike the background layer, the foreground layer distributed to edge device 430 and the foreground layer and the interaction layer distributed to user equipment 440 may be unprocessed. In other words, the foreground layer may be processed by edge device 430, and then the processed foreground layer is sent to user equipment 440 for presentation and interaction. The interaction layer in the virtual visual content may be sent to user equipment 440 via edge device 430, and may be processed locally by user equipment 440 itself. Therefore, complete virtual visual content may be presented on the user equipment, including the background layer processed by cloud computing device 410, the foreground layer processed by edge device 430, and the interaction layer processed by user equipment 440 itself.

As shown in FIG. 4, in order to save storage resources at edge device 430 and reduce the traffic burden on the core network between cloud computing device 410 and edge device 430, the foreground layer may only be sent to edge devices 430-3 and 430-4 in user active area 450. The user active area refers to a predicted area where user equipment 440 is currently located or may move to within a future period of time. It should be understood that the number of edge devices in the user active area (e.g., two edge devices in FIG. 4) is less than the number of all edge devices. Therefore, by sending the foreground layer of the virtual visual content only to edge devices 430-3 and 430-4 in user active area 450, the virtual visual content is effectively and accurately distributed, which can save storage resources at edge device 430 and reduce unnecessary network traffic burden on the core network. The process of distributing the foreground layer is described in detail below with reference to FIG. 5.

It should be understood that the structure of example visual content distribution system 400 is described for illustrative purposes only, and does not imply any limitation to the scope of the present disclosure. For example, the embodiments of the present disclosure may also be applied to a system different from example visual content distribution system 400. It should be understood that the specific number of edge devices and user equipment described above, the number of user equipment in the user active area, and a connection relationship between the edge devices and the user equipment are given for illustrative purposes only, and do not imply any limitation to the scope of the present disclosure.

Figure 5:
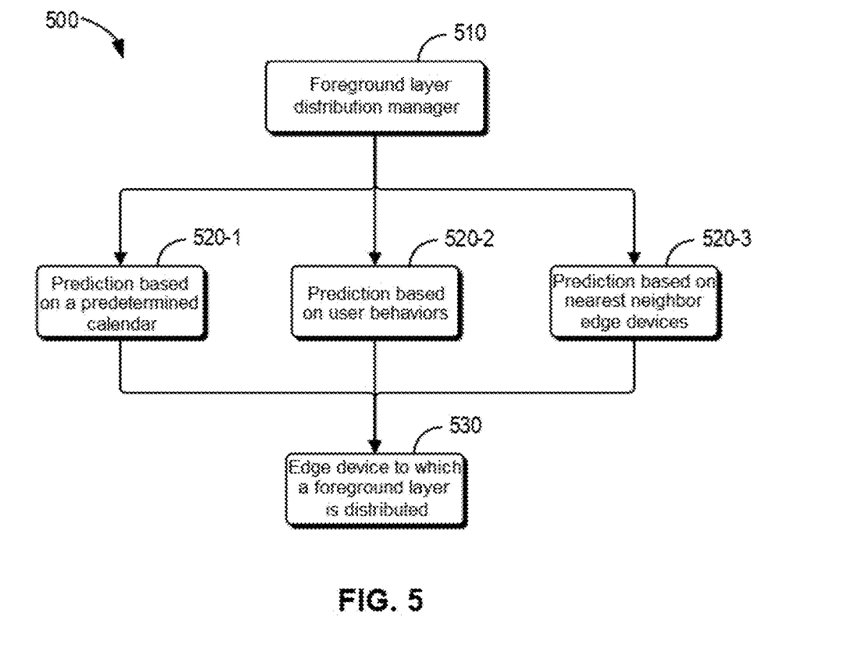
FIG. 5 shows a schematic block diagram of a process for distributing a foreground layer of virtual visual content according to an embodiment of the present disclosure.

FIG. 5 shows a schematic block diagram 500 of a process for distributing a foreground layer of virtual visual content according to an embodiment of the present disclosure. According to the embodiments of the present disclosure, the process of distributing a foreground layer of virtual visual content may be implemented when user equipment is online. A user active area and a corresponding edge device may be predicted based on information related to the user equipment, and then the foreground layer of the virtual visual content may be dynamically distributed to the predicted edge device.

As shown in FIG. 5, foreground layer distribution manager 510 implements prediction for an edge device used to distribute the foreground layer. Foreground layer distribution manager 510 may be deployed in edge content distribution manager 420 described with reference to FIG. 4, for example, as a subroutine thereof. According to the embodiments of the present disclosure, the edge device used to distribute the foreground layer may be predicted through three modes: prediction 520-1 based on a predetermined calendar, prediction 520-2 based on user behaviors, and prediction 520-3 based on nearest neighbor edge devices, which are related to individual user equipment.

The predetermined calendar may be stored on user equipment (content viewing device such as VR/AR) or other devices (such as a smart phone, a tablet computer, or a laptop) that are associated with the user equipment and connected to a network. The predetermined calendar may include time and locations associated with the user's activities. When the user equipment is online, for example, when the user equipment is started or a VR/AR application on the user equipment is started, the predetermined calendar in the user equipment may be accessed. In this case, the user equipment may send an activity location in the calendar to a server of the VR/AR application. Then, foreground layer distribution manager 510 may find nearby edge devices based on the active location as predicted edge device 530 to which the foreground layer is distributed. In some embodiments, the location may be identified by a location name in a text format, or may be identified by a geographic position including longitude and latitude. In the case where the location is in a text format, foreground layer distribution manager 510 may parse out the geographic position of longitude and latitude thereof with the help of map information, and then find the edge devices near the location from all edge devices. Then, the foreground layer of the virtual visual content is transmitted to these edge devices.

In some embodiments, the virtual visual content may also be predicted based on the attributes of the activity location in predetermined calendar 520-1. For example, if the activity location is a theater, it may be predicted that the virtual visual content may be a virtual theater, if the activity location is a football field, it may be predicted that the virtual visual content may be a virtual stadium, etc. Correspondingly, the foreground layer in the virtual visual content may be transmitted to edge devices near these locations in advance.

According to the embodiments of the present disclosure, foreground layer distribution manager 510 may also implement prediction 520-2 based on user behaviors. Prediction 520-2 based on user behaviors may include, but is not limited to, predicting, based on a historical position of the user equipment, a possible location of the user equipment within a future period of time. For example, it is possible to collect positions of the user equipment at different times of one day in the past period of time (e.g., the previous day, the previous three days, the previous week, the previous month, etc.). For example, if the user equipment has appeared in a certain office building at 10 am every day in the past week, it may be predicted that the user will be more likely to appear in the office building at the same time. Similarly, foreground layer distribution manager 510 may use the location to find edge devices near the location as a predicted edge device to which the foreground layer in the virtual visual content is transmitted. Alternatively or additionally, a machine learning model may be used to predict user behaviors. For example, user historical behaviors (e.g., including information such as date, time of day, day of the week, location, whether to use a VR/AR application, etc.) may be input to the machine learning model as training data. The trained model may then be used to predict user behaviors. It should be understood that the prediction result may be a future period of time, at least one location, and its corresponding probability, which represents a possible location of the user in the future period of time, and the probability of the user at the possible location. Then, foreground layer distribution manager 510 may use, for example, one or more locations with the maximum probability to find edge devices near the location as a predicted edge device to which the foreground layer in the virtual visual content is transmitted.

Similarly, the user historical behaviors may also include specific VR/AR applications used by the user. For example, if the used VR/AR application is a virtual theater, the foreground layer of virtual visual content related to the virtual theater may be transmitted to an edge device as the prediction result. If the used VR/AR application may be a virtual football game, the foreground layer of virtual visual content related to the virtual football game may be transmitted to an edge device as the prediction result, etc.

According to the embodiments of the present disclosure, foreground layer distribution manager 510 may also implement prediction 520-3 based on nearest neighbor edge devices. This will be described in detail below with reference to FIG. 6.

Figure 6:
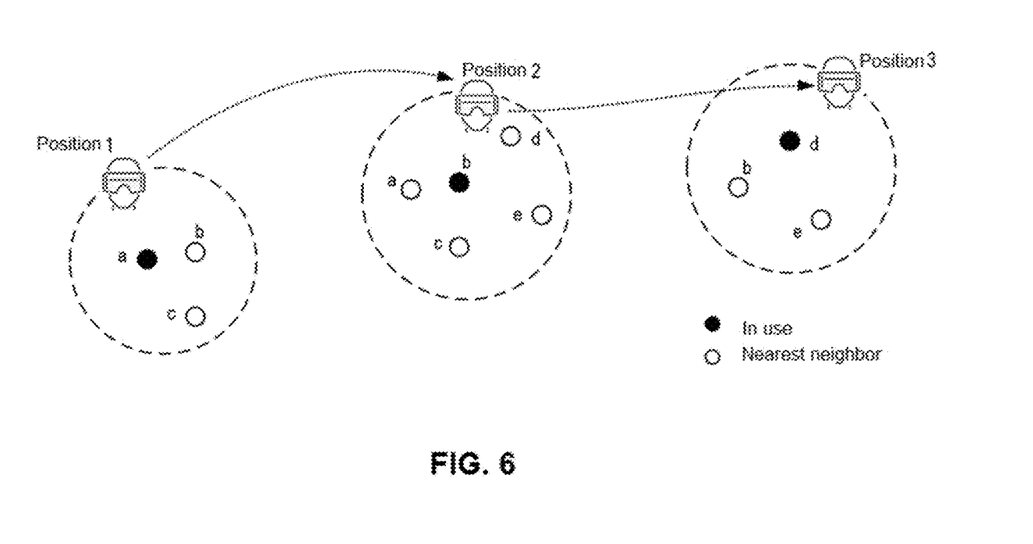
FIG. 6 shows a schematic diagram of a method for predicting a nearest neighbor edge device according to an embodiment of the present disclosure.

FIG. 6 shows a schematic diagram of a method for predicting a nearest neighbor edge device according to an embodiment of the present disclosure. In FIG. 6, a solid circle represents an edge device being currently used by user equipment 440, and an open circle represents other edge devices that are nearest to the edge device being currently used. Here, the nearest neighbor edge devices may mean other edge devices away from the edge device in use by a physical distance within a threshold (including but not limited to 100 meters, 200 meters, 500 meters, 1 km, etc.). Alternatively or additionally, the nearest neighbor edge devices may also mean that other metrics (e.g., communication delay) with respect to the edge device in use are within the threshold. According to the embodiments of the present disclosure, a list of other edge devices associated with each edge device is stored at cloud computing device 410, thereby determining the nearest neighbor edge devices more quickly.

As shown in FIG. 6, when the user equipment (e.g., user equipment 440-3 and 440-4 of FIG. 4) is located at position 1, the user equipment is connected to edge device a (e.g., edge devices 430-3 and 430-4), that is, edge device a is the edge device in use. At this moment, virtual visual content being currently used by the user equipment is stored on edge device a, including at least the foreground layer and the background layer of the virtual visual content (because the interaction layer may be processed, stored, and interacted on the user equipment). According to the embodiments of the present disclosure, foreground layer distribution manager 510 may determine that the nearest neighbors of edge device a are edge devices b and c, and trigger edge devices b and c to request the cloud computing device (e.g., data center/cloud computing device 410 in FIG. 4) for the foreground layer of the virtual visual content of the user equipment. In response to this, edge devices b and c may receive the corresponding foreground layer content from the cloud computing device. Alternatively or additionally, foreground layer distribution manager 510 may also trigger edge devices b and c to request edge device a for the foreground layer of the virtual visual content. In this way, the foreground layer content is copied from edge device a in use to nearest neighbor edge devices b and c, so that the latest foreground layer is stored in advance on edge devices b and c.

Then, the user equipment moves to position 2. At position 2, the user equipment is far away from edge device a used originally, so the edge device in use becomes edge device b. Since edge device b has stored the foreground layer of the virtual visual content in advance, the user equipment does not need to request the cloud computing device for the data again, thereby eliminating or alleviating the jam of the moving user equipment caused by switching the edge devices. Similarly, when the user equipment is at position 2 and uses edge device b, foreground layer distribution manager 510 may determine that the nearest neighbors of edge device b are edge devices a, c, d, and e. Therefore, edge devices d and e may be triggered to request the foreground layer of the virtual visual content, and edge devices a and c have already stored the foreground layer content, so there is no need to perform this operation in those edge devices.

Next, the user equipment moves to position 3. At position 3, the user equipment is far away from edge device b used previously, so the edge device in use becomes edge device d. Since edge device d has stored the foreground layer of the virtual visual content in advance, the user equipment does not need to request the cloud computing device for the data again, thereby eliminating or alleviating the jam of the moving user equipment caused by switching the edge devices. When the user equipment is at position 3 and uses edge device d, foreground layer distribution manager 510 may determine that the nearest neighbors of edge device d are edge devices b and e. Edge devices b and e have already stored the foreground layer content, so no new edge device needs to request the virtual visual content of the user equipment at this moment.

In some embodiments, the virtual visual content stored in the edge device may have a life cycle. For example, when the user equipment goes offline for a period of time, when the user equipment no longer uses the edge device for a period of time, or when the virtual visual content exists on the edge device for more than a preset time, the virtual visual content may be cleared from the edge device to ensure the effective use of storage resources of the edge device.

Through the three modes of predicting edge devices described above, it is not necessary to send the virtual visual content to all edge devices during peak usage periods, thereby saving the burden on the core network and improving distribution efficiency.

Figure 7:
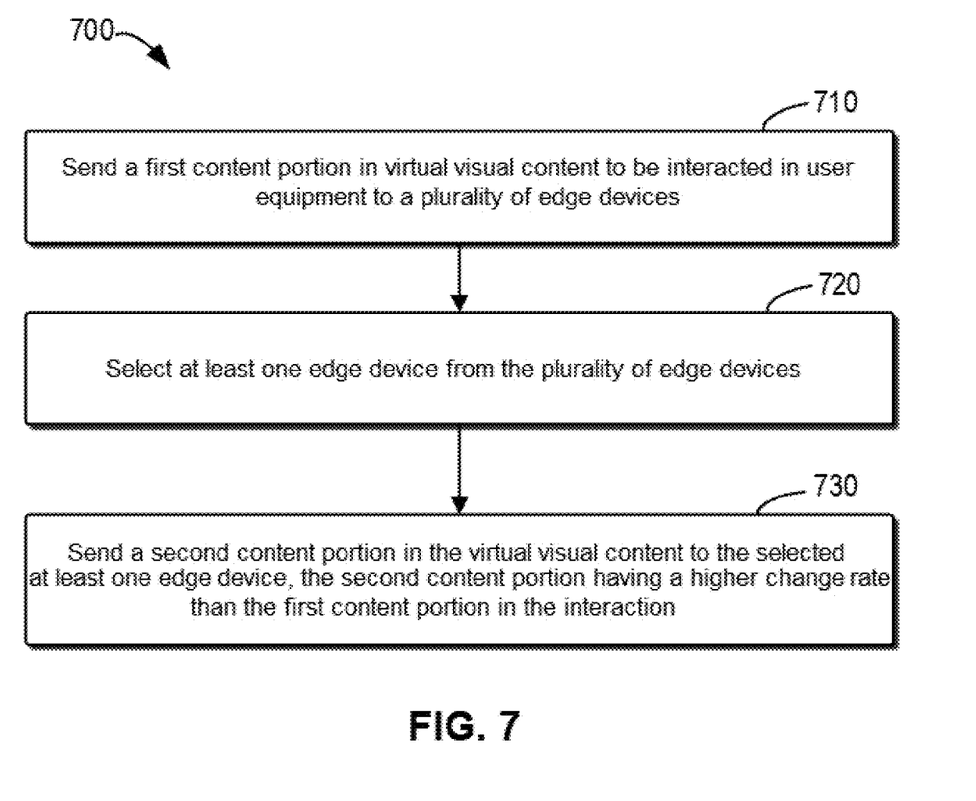
FIG. 7 shows a schematic flow chart of a method for distributing virtual visual content according to an embodiment of the present disclosure.

FIG. 7 shows a schematic flow chart of a method 700 for distributing virtual visual content according to an embodiment of the present disclosure. Method 700 may be implemented by, for example, data center/cloud computing device 410 deployed in the cloud. Method 700 includes: sending a first content portion in virtual visual content to be interacted in user equipment to a plurality of edge devices in step 710. Method 700 further includes: selecting at least one edge device from the plurality of edge devices in step 720. Method 700 further includes: sending a second content portion in the virtual visual content to the selected at least one edge device in step 730, the second content portion having a higher change rate than the first content portion in the interaction. The first content portion may be a background layer that is constant or changes slowly in the virtual visual content, which is distributed to a plurality of edge devices after being processed. The second content portion may be a moderately changing foreground layer in the virtual visual content, which may be distributed to at least one edge device selected from a plurality of edge devices for processing, and then distributed to the user equipment after being processed.

According to method 700, a portion of virtual visual content can be distributed to selected edge devices in advance, and there is no need to distribute the virtual visual content to all edge devices, thereby saving network burden, reducing bandwidth requirements, and improving distribution efficiency.

In some embodiments, sending the first content portion to the plurality of edge devices may include: when the user equipment is offline, sending the first content portion to the plurality of edge devices. As described above, the change frequency of the first content portion such as the background layer is low, and there is no difference or little difference between different user equipment. Therefore, by distributing the first content portion to the edge devices when the user equipment is offline, the user equipment may directly acquire the first content portion from an edge device nearby, thereby reducing the traffic burden on the core network during peak usage of the user equipment.

In some embodiments, selecting the at least one edge device may include: determining a location of an activity indicated in a calendar of the user equipment; and selecting at least one edge device located near the location from the plurality of edge devices. Therefore, it is possible to predict an edge device that may be used by the user equipment based on information of the calendar of the user equipment, thereby more effectively and accurately distributing virtual visual content.

In some embodiments, selecting the at least one edge device may include: predicting, based on a historical position of the user equipment, a possible location of the user equipment within a future period of time; and selecting at least one edge device located near the possible location from the plurality of edge devices. Therefore, it is possible to predict an edge device that may be used by the user equipment based on a historical user behavior, thereby more effectively and accurately distributing virtual visual content.

In some embodiments, selecting the at least one edge device may include: selecting at least one neighbor edge device of an edge device being used by the user equipment from the plurality of edge devices. Therefore, it is possible to predict an edge device that may be used by the user equipment based on a current position of the user equipment, thereby more effectively and accurately distributing virtual visual content.

In some embodiments, a third content portion in the virtual visual content is sent to the user equipment, the third content portion having a higher change rate than the second content portion in the interaction. Therefore, virtual visual content with a high change frequency may be distributed to the user equipment for processing locally, so as to meet low-delay requirements and improve user experience.

Further, in some embodiments, the third content portion is an interaction component in the virtual visual content. When using a VR/AR application, the user needs to frequently use the interaction component and change the presentation of virtual visual content, so the interaction frequency of the interaction component is higher than other content. Distributing it to the user equipment for processing can meet low-delay requirements and improve user experience.

In some embodiments, the first content portion includes a background portion in the virtual visual content, and the second content portion includes a foreground portion in the virtual visual content. As described above, the first content portion may be a background layer that is constant or changes slowly in the virtual visual content, which is distributed to a plurality of edge devices after being processed. The second content portion may be a moderately changing foreground layer in the virtual visual content, which may be distributed to at least one edge device selected from a plurality of edge devices for processing, and then distributed to the user equipment after being processed. By distributing virtual visual content with different change frequencies to computing devices having different proximities to user equipment, it is beneficial to reduce network burden and reduce delay, thereby improving user experience.

Figure 8:
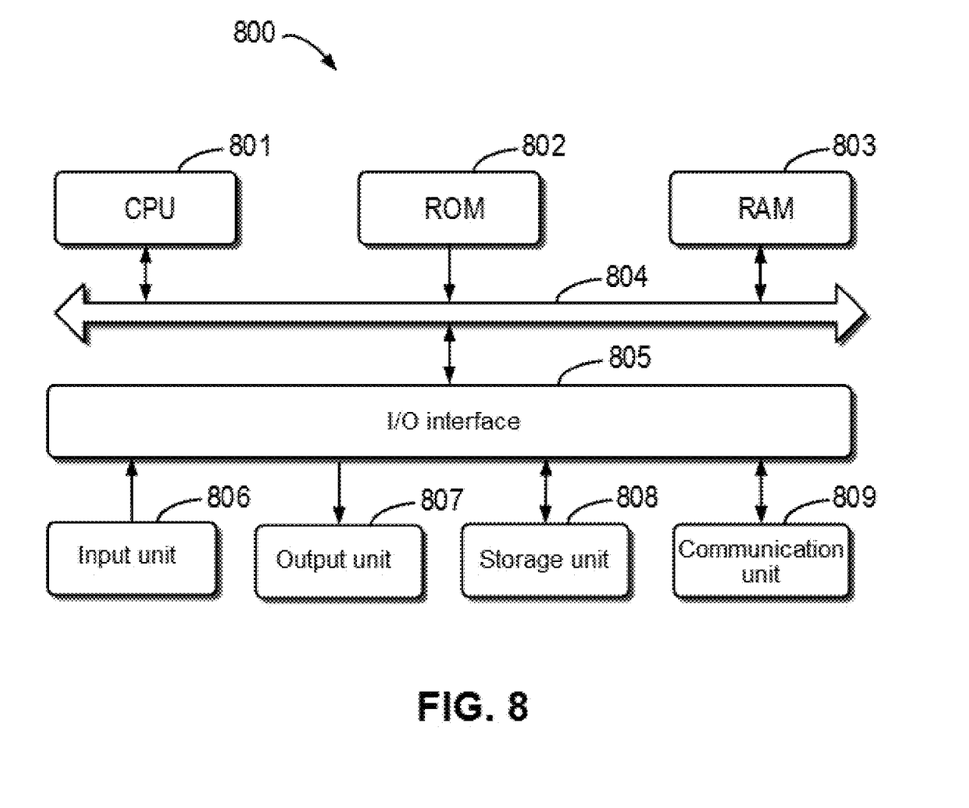
FIG. 8 shows a schematic block diagram of a device that may be used to implement an embodiment of the present disclosure.

FIG. 8 shows a schematic block diagram of device 800 that may be used to implement an embodiment of the present disclosure. Device 800 may be used to implement cloud computing devices, edge devices, and example visual management system 100 and example visual content distribution system 400 running thereon as described above with reference to the accompanying drawings. As shown in the figure, device 800 includes a processing unit, illustratively a central processing unit (CPU) 801, which may execute various appropriate actions and processing in accordance with computer program instructions stored in read-only memory (ROM) 802 or computer program instructions loaded onto random access memory (RAM) 803 from storage unit 808. In RAM 803, various programs and data required for the operation of device 800 may also be stored. CPU 801, ROM 802, and RAM 803 are connected to each other through bus 804. Input/output (I/O) interface 805 is also connected to bus 804.

A plurality of components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The methods or processes described above may be executed by CPU 801. For example, in some embodiments, the method may be embodied as a computer software program that is tangibly included in a machine-readable medium, such as storage unit 808. In some embodiments, part of or all the computer program may be loaded into and/or installed onto device 800 via ROM 802 and/or communication unit 809. When the computer program is loaded into RAM 803 and executed by CPU 801, one or more steps or actions of the methods or processes described above may be implemented.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, as well as conventional procedural programming languages. The computer-readable program instructions may be executed entirely on a user's computer, partly on a user's computer, as a stand-alone software package, partly on a user's computer and partly on a remote computer, or entirely on a remote computer or server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to work in a specific manner; and thus the computer-readable medium having stored instructions includes an article of manufacture including instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the devices, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented by using a special hardware-based system for executing specified functions or actions or by a combination of special hardware and computer instructions.

Various embodiments of the present disclosure have been described above. The foregoing description is illustrative rather than exhaustive, and is not limited to the disclosed embodiments. Numerous modifications and alterations are apparent to those of ordinary skill in the art without departing from the scope and spirit of the illustrated embodiments. The selection of terms used herein is intended to best explain the principles and practical applications of the embodiments or technical improvements to technologies in the market, and to otherwise enable persons of ordinary skill in the art to understand the embodiments disclosed herein.

What is claimed is:

1. A method for distributing virtual visual content, comprising:
   determining, by a content distribution manager associated with a cloud computing device, a plurality of content portions having different change rates in virtual visual content;
   sending, from the content distribution manager, a first content portion of the plurality of content portions in the virtual visual content to be interacted in user equipment to a plurality of edge devices;
   selecting at least one edge device from the plurality of edge devices; and
   sending, from the content distribution manager, a second content portion of the plurality of content portions in the virtual visual content to the selected at least one edge device, the second content portion having a higher change rate than the first content portion in the interaction;
   wherein the method further comprises:
   separating the plurality of edge devices into a first group of edge devices outside of a specified user active area and a second group of edge devices within the specified user active area, the first group of edge devices being different than the second group of edge devices, each of the edge devices in each of the first and second groups of edge devices being designated to receive at least one of the plurality of content portions having different change rates in virtual visual content, with different ones of the edge devices in different ones of the first and second groups of edge devices being designated to receive different ones of the plurality of content portions;
   wherein the content distribution manager sends the first content portion but not the second content portion to at least a first one of the plurality of edge devices in the first group of edge devices that is outside of the specified user active area; and
   wherein the content distribution manager sends both the first content portion and the second content portion to at least a second one of the plurality of edge devices in the second group of edge devices that is within the specified user active area.

2. The method according to claim 1, wherein sending the first content portion to the plurality of edge devices comprises:
   when the user equipment is offline, sending the first content portion to the plurality of edge devices.

3. The method according to claim 1, wherein selecting the at least one edge device comprises:
   determining a location of an activity indicated in a calendar of the user equipment; and
   selecting at least one edge device located near the location from the plurality of edge devices.

4. The method according to claim 1, wherein selecting the at least one edge device comprises:
   predicting, based on a historical position of the user equipment, a possible location of the user equipment within a future period of time; and
   selecting at least one edge device located near the possible location from the plurality of edge devices.

5. The method according to claim 1, wherein selecting the at least one edge device comprises:
   selecting at least one neighbor edge device of an edge device being used by the user equipment from the plurality of edge devices.

6. The method according to claim 1, further comprising:
   sending a third content portion of the plurality of content portions in the virtual visual content to the user equipment, the third content portion having a higher change rate than the second content portion in the interaction.

7. The method according to claim 6, wherein the third content portion is an interaction component in the virtual visual content.

8. The method according to claim 1, wherein the first content portion comprises a background portion in the virtual visual content, and the second content portion comprises a foreground portion in the virtual visual content.

9. An electronic device, comprising:
   at least one processing unit; and
   at least one memory coupled to the at least one processing unit and storing instructions for execution by the at least one processing unit, wherein the instructions, when executed by the at least one processing unit, cause the electronic device to perform actions comprising:
   determining, by a content distribution manager associated with a cloud computing device, a plurality of content portions having different change rates in virtual visual content;

sending, from the content distribution manager, a first content portion of the plurality of content portions in the virtual visual content to be interacted in user equipment to a plurality of edge devices;

selecting at least one edge device from the plurality of edge devices; and sending, from the content distribution manager, a second content portion of the plurality of content portions in the virtual visual content to the selected at least one edge device, the second content portion having a higher change rate than the first content portion in the interaction;

wherein the actions further comprise:

separating the plurality of edge devices into a first group of edge devices outside of a specified user active area and a second group of edge devices within the specified user active area, the first group of edge devices being different than the second group of edge devices, each of the edge devices in each of the first and second groups of edge devices being designated to receive at least one of the plurality of content portions having different change rates in virtual visual content, with different ones of the edge devices in different ones of the first and second groups of edge devices being designated to receive different ones of the plurality of content portions;

wherein the content distribution manager sends the first content portion but not the second content portion to at least a first one of the plurality of edge devices in the first group of edge devices that is outside of the specified user active area; and wherein the content distribution manager sends both the first content portion and the second content portion to at least a second one of the plurality of edge devices in the second group of edge devices that is within the specified user active area.

10. The electronic device according to claim 9, wherein sending the first content portion to the plurality of edge devices comprises:

when the user equipment is offline, sending the first content portion to the plurality of edge devices.

11. The electronic device according to claim 9, wherein selecting the at least one edge device comprises:

determining a location of an activity indicated in a calendar of the user equipment; and selecting at least one edge device located near the location from the plurality of edge devices.

12. The electronic device according to claim 9, wherein selecting the at least one edge device comprises:

predicting, based on a historical position of the user equipment, a possible location of the user equipment within a future period of time; and selecting at least one edge device located near the possible location from the plurality of edge devices.

13. The electronic device according to claim 9, wherein selecting the at least one edge device comprises:

selecting at least one neighbor edge device of an edge device being used by the user equipment from the plurality of edge devices.

14. The electronic device according to claim 9, wherein the actions further comprise:

sending a third content portion of the plurality of content portions in the virtual visual content to the user equipment, the third content portion having a higher change rate than the second content portion in the interaction.

15. The electronic device according to claim 14, wherein the third content portion is an interaction component in the virtual visual content.

16. The electronic device according to claim 9, wherein the first content portion comprises a background portion in the virtual visual content, and the second content portion comprises a foreground portion in the virtual visual content.

17. A computer program product, being tangibly stored on non-transitory computer-readable medium and comprising machine-executable instructions that, when executed by a device, cause the device to perform a method for distributing virtual visual content, the method comprising:

determining, by a content distribution manager associated with a cloud computing device, a plurality of content portions having different change rates in virtual visual content;

sending, from the content distribution manager, a first content portion of the plurality of content portions in the virtual visual content to be interacted in user equipment to a plurality of edge devices;

selecting at least one edge device from the plurality of edge devices; and sending, from the content distribution manager, a second content portion of the plurality of content portions in the virtual visual content to the selected at least one edge device, the second content portion having a higher change rate than the first content portion in the interaction;

wherein the method further comprises:

separating the plurality of edge devices into a first group of edge devices outside of a specified user active area and a second group of edge devices within the specified user active area, the first group of edge devices being different than the second group of edge devices, each of the edge devices in each of the first and second groups of edge devices being designated to receive at least one of the plurality of content portions having different change rates in virtual visual content, with different ones of the edge devices in different ones of the first and second groups of edge devices being designated to receive different ones of the plurality of content portions;

wherein the content distribution manager sends the first content portion but not the second content portion to at least a first one of the plurality of edge devices in the first group of edge devices that is outside of the specified user active area; and wherein the content distribution manager sends both the first content portion and the second content portion to at least a second one of the plurality of edge devices in the second group of edge devices that is within the specified user active area.

18. The computer program product according to claim 17, wherein sending the first content portion to the plurality of edge devices comprises:

when the user equipment is offline, sending the first content portion to the plurality of edge devices.

19. The computer program product according to claim 17, wherein selecting the at least one edge device comprises:

determining a location of an activity indicated in a calendar of the user equipment; and selecting at least one edge device located near the location from the plurality of edge devices.

20. The computer program product according to claim 17, wherein the first content portion comprises a background portion in the virtual visual content, and the second content portion comprises a foreground portion in the virtual visual content.

* * * * *